United States Patent [19]

Bridges

[11] Patent Number: 4,884,282
[45] Date of Patent: Nov. 28, 1989

[54] COUPLED WAVEGUIDE LASER ARRAY

[75] Inventor: William B. Bridges, Pasadena, Calif.

[73] Assignee: California Institute of Technology, Pasadena, Calif.

[21] Appl. No.: 211,886

[22] Filed: Jun. 27, 1988

[51] Int. Cl.⁴ .......................... H01S 3/082; H01S 3/03
[52] U.S. Cl. ........................................ 372/97; 372/64; 372/107; 372/108
[58] Field of Search .................. 372/64, 65, 66, 97, 372/98, 99, 107, 108

[56] References Cited

U.S. PATENT DOCUMENTS

| 4,577,323 | 3/1986 | Newman et al. | 372/64 |
| 4,688,228 | 8/1987 | Newman et al. | 372/64 |
| 4,719,640 | 1/1988 | Chenausky et al. | 372/64 |

OTHER PUBLICATIONS

"Coupled High Power Waveguide Laser Research", L. A. Newman et al., *Final Report*, United Technologies Research Center, East Hartford, Conn., Jul. 30, 1985.
"Coupled High Power Waveguide Laser Research", A. J. Cantor et al., *Interim Report*, United Technologies Research Center, East Hartford, Conn., Oct. 31, 1986.
"Phase Locking of Adjacent Channel Leaky Waveguide $CO_2$ Lasers", by D. G. Yumans, *Applied Physics Letters*, vol. 44(4), pp. 365-367, Feb. 1984.
"High Power Coupled $CO_2$ Waveguide Laser Array", L. A. Newman et al., Applied Physics Letter, vol. 48(25), Jun. 23, 1986.

*Primary Examiner*—William L. Sikes
*Assistant Examiner*—Georgia Y. Epps
*Attorney, Agent, or Firm*—William J. Benman, Jr.

[57] ABSTRACT

An improved coupled waveguide laser array which provides a set of in-phase, phase locked optical beams is disclosed herein. The improved laser array of the present invention includes first and second coupled cavities for providing first and second beams in a first direction, respectively. The first and second cavities have substantially parallel longitudinal axes and apertures at first ends thereof for emitting the first and second beams. A mirror is mounted in a plane transverse to the longitudinal cavity axes and includes a first partially transmissive section mounted in optical alignment with the first cavity. The mirror further includes a first substantially reflective section mounted in optical alignment with the second cavity.

6 Claims, 2 Drawing Sheets

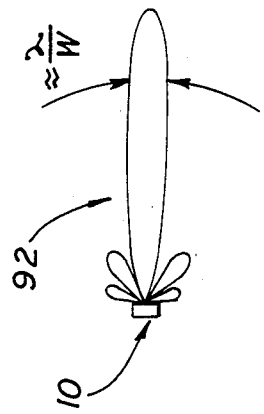
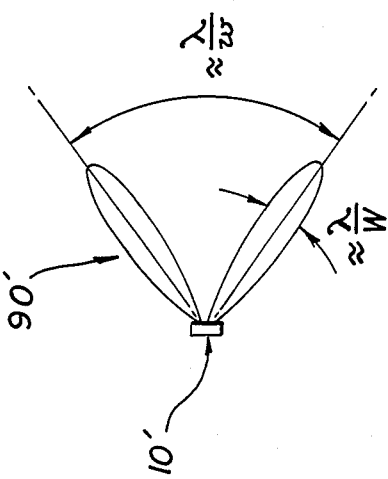
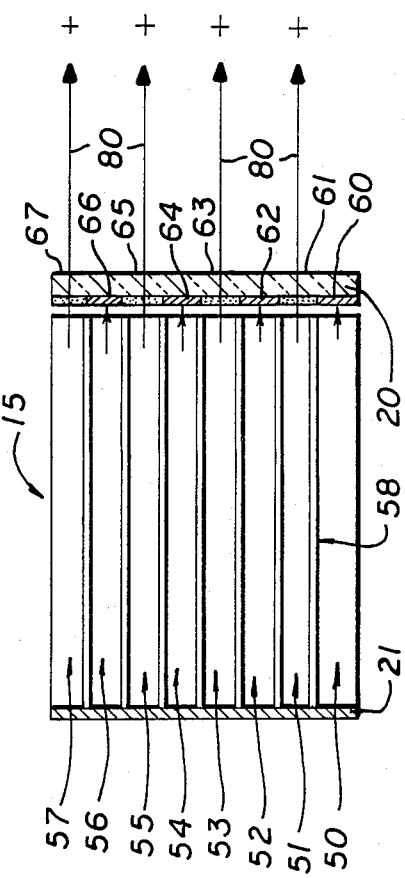
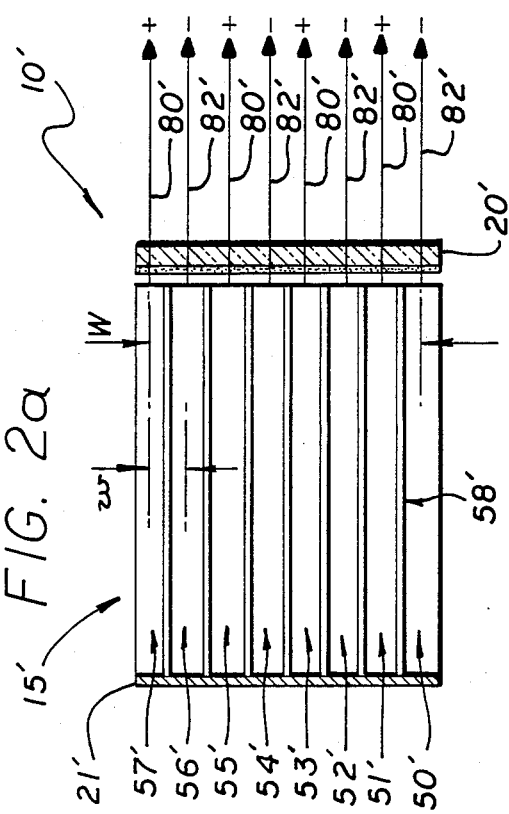

COUPLED WAVEGUIDE LASER ARRAY

BACKGROUND OF THE INVENTION

1. Field of the Invention

This invention relates to lasers. More specifically, this invention relates to coupled waveguide laser arrays.

While the present invention is described herein with reference to a particular embodiment for a particular application, it is understood that the invention is not limited thereto. Those having ordinary skill in the art and access to the teachings provided herein will recognize additional embodiments within the scope thereof.

2. Description of the Related Art

Gas lasers, particularly $CO_2$ gas lasers, are utilized in a variety of industrial, medical and military applications. Nonetheless, gas lasers are known to have some limitations. For example, conventional gas lasers include a sealed glass tube, a cooling jacket, cavity mirrors, and discharge electrodes with associated driving circuitry. The electrodes are positioned within the glass tube and excite a gas mixture through a longitudinal DC discharge. This common excitation method tends to affect the composition of the gas mixture adversely. That is, depletion of oxygen from the typically $CO_2$ based gas mixture tends to reduce the operational lifetime of the laser.

Further, conventional gas lasers are inappropriate for certain applications as a result of their fragility and large size and weight.

Waveguide lasers were initially developed in an effort to provide more durable and compact sources of laser light. Conventional waveguide lasers include a hollow bore waveguide enclosing an active (gas) medium, reflecting mirrors, and a typically multiple electrode configuration. However, the direct current discharge typically required to energize conventional waveguide lasers has also been found to lead to oxidation of the active medium as discussed above.

Transverse radio frequency (rf) excited waveguide lasers provide a number of advantages relative to conventional waveguide lasers. Structurally, rf-excited waveguide lasers typically consist of two ceramic plates sandwiched between a pair of electrodes thereby forming a hollow bore waveguide. An active medium is enclosed within the bore, and resonator mirrors are generally disposed at two ends of the waveguide. Auxiliary shunt inductors appended to the waveguide structure complement the capacitance provided by the parallel electrodes to form what may be envisioned as a resonant electrical circuit. The frequency of the rf excitation signal is chosen to be the resonant frequency of the "circuit".

This method of excitation does not require insertion of an electrode into the active medium and hence obviates the contamination difficulties discussed above. Further, the magnitude of the rf voltage applied to the electrodes is generally significantly lower than the magnitude of voltage in the discharges mentioned above. Consequently, the excitation circuitry of rf-excited waveguide lasers is typically less complicated than that of d.c. actuated waveguide lasers.

Though offering a variety of improvements over waveguide lasers stimulated by a d.c. discharge, single bore RF excited waveguide lasers are typically limited to low power (less than 30 watts) applications. It is known that the optical output power of single bore waveguide lasers may be increased to some extent through increases in bore length. However, the resonating mirrors at either end of the bore may be damaged as a result of excessive intra-cavity cavity laser power density.

Efforts to increase the intensity of beams generated by rf excited waveguide lasers have included the implementation of "folded resonator" mirror geometries. In these "folded waveguide" lasers a plurality of mirrors are used to induce optical energy within the waveguide bore to oscillate in a number geometric patterns. A primary advantage of folded waveguide lasers is that optical power output may be increased without increasing the overall length of the laser. However, the optical power handling capability of the resonator mirrors limits the maximum available output power of folded waveguide lasers to that of single bore waveguide lasers.

Waveguide laser arrays have been developed as an alternative for the attainment of relatively high output power from a compact laser source. Waveguide laser arrays typically include a dielectric layer sandwiched between a pair of electrodes (see e.g., Cantor et al.; "Coupled High Power Waveguide Laser Research"; *Interim Report,* United Technologies Research Center East Hartford, Connecticut; October 31, 1986.) The dielectric layer includes multiple hollow bores. Portions of internal surfaces of each bore provide electrodes. Resonating mirrors are generally positioned adjacent to apertures at either end of each bore and are oriented perpendicular to the longitudinal axis of the bores.

In this configuration, increases in the number of elements (proportional to output power) in the waveguide laser array result in proportional increases in the effective area of the resonator mirrors. Hence, an advantage of waveguide laser arrays is that output power may be increased without increasing the intensity (power/area) of optical power incident on the resonator mirrors.

In order to obtain optimum far field beam patterns from waveguide laser arrays it is necessary for the individual array elements to oscillate with the same frequency and phase. As a consequence, a number of schemes have been proposed for phase locking waveguide laser arrays. For example, phase locked operation has been obtained for a pair of adjacent $CO_2$ waveguide lasers separated by a plate of ZnSe which allows a portion of the radiation from one of the waveguides to leak into the adjacent waveguide (D.G. Youmans; "Phase Locking of Adjacent Channel Leaky Waveguide $CO_2$ Lasers"; Applied Physics Letters. Vol. 44 (4), February 15, 1984). However, a disadvantage of this scheme is that the ZnSe window is exposed to ion bombardment and heating by the laser discharge. Alternatively, as disclosed by L.A. Newman, et al. in "High Power Coupled $CO_2$ Waveguide Laser Array", Applied Physics Letters, Vol. 48 (25), June 23 1986, phase locked operation has been demonstrated in a guide structure termed a "hollow-bore ridge waveguide". In this structure coupling of radiation between waveguides occurs through simple longitudinal slots running the length of the guide.

Coupled waveguide laser arrays such as those described above may oscillate in a variety of phase locked conditions. In many applications a particularly desirable oscillation condition is one in which the outputs from each bore are of a common optical phase. This manner of oscillation is often referred to as the "lowest order supermode" of the array and results in output of a single, narrow beam. Alternatively, the array is characterized as oscillating in the "highest order supermode" when adjacent waveguides phase lock 180 degrees apart. The output of the array in this latter case includes a pair of beams oriented in slightly different directions, a less useful beam pattern for most applications. However, in certain waveguide laser arrays (e.g. in the array of Newman et al.) the highest order supermode is more easily excited than the lowest order supermode, notwithstanding the comparatively greater utility of the beams produced by arrays oscillating in the latter mode.

Hence a need in the art exists for an improved waveguide laser array which provides a set of in-phase, phase locked optical beams.

SUMMARY OF THE INVENTION

The need in the art for an improved waveguide laser array which provides a set of in-phase, phase locked optical beams is addressed by the improved coupled waveguide laser array of the present invention. The improved laser array of the present invention includes first and second coupled cavities for providing first and second beams in a first direction, respectively. The first and second cavities have substantially parallel longitudinal axes and apertures at first ends thereof for emitting the first and second beams. A mirror is mounted in a plane transverse to the longitudinal cavity axes and includes a first substantially transmissive section in optical alignment with the first cavity. The mirror further includes a first substantially reflective section in optical alignment with the second cavity.

BRIEF DESCRIPTION OF THE DRAWINGS

FIG. 2a is a top sectional view of a conventional coupled waveguide laser array.

FIG. 2b is an illustrative representation of a dual lobe far-field radiation pattern produced by a set of optical beams phase locked 180 degrees out of phase.

FIG. 3a is a top sectional view of a preferred embodiment of the improved coupled waveguide laser array of the present invention.

FIG. 3b is an illustrative representation of a substantially single lobe far-field radiation pattern produced by a set of symmetrically phase locked optical beams.

DESCRIPTION OF THE INVENTION

Figure 1:
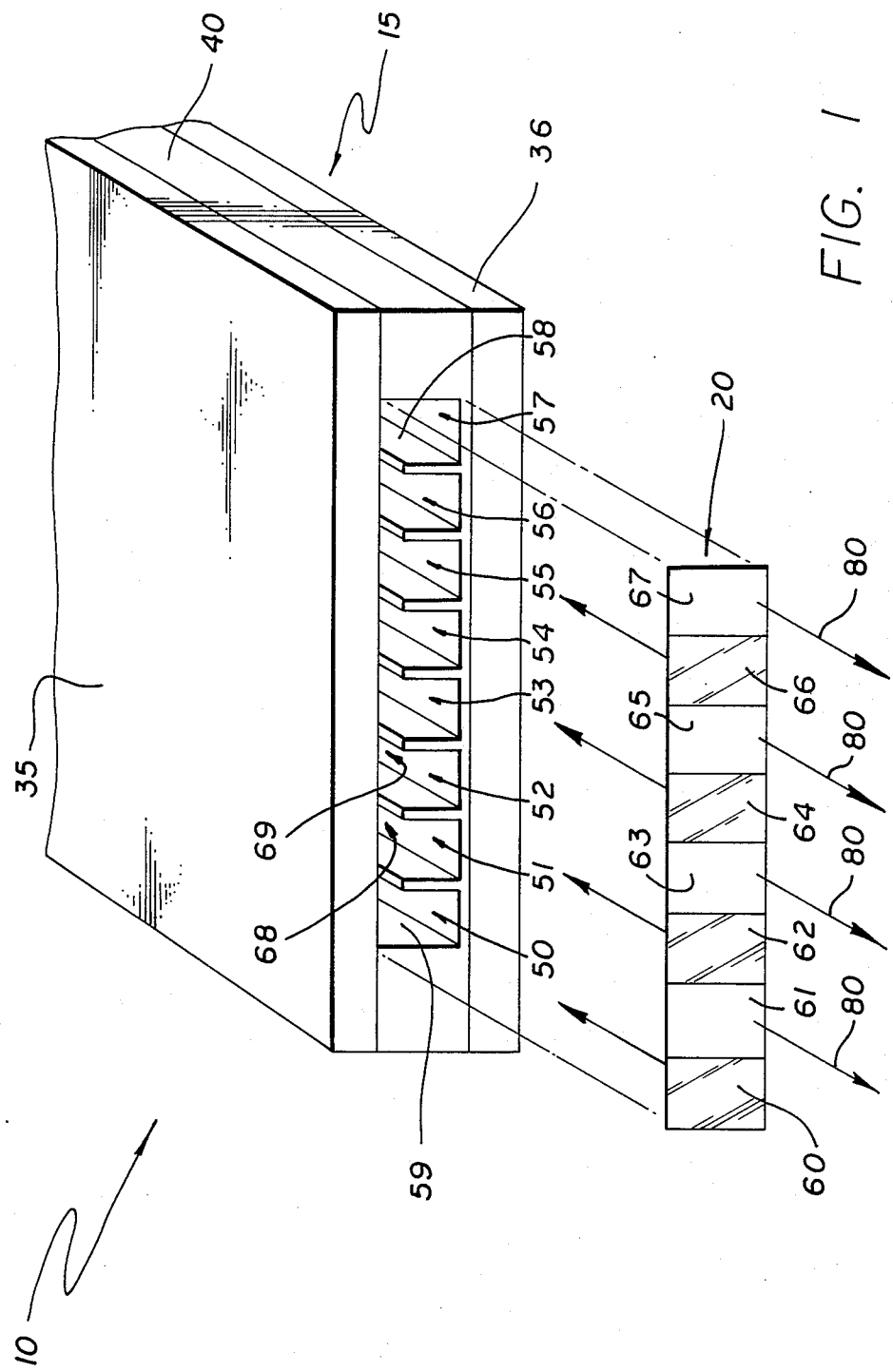
FIG. 1 is a partially disassembled front view of a preferred embodiment of the improved coupled waveguide laser array of the present invention.

FIG. 1 shows a front view of the improved coupled waveguide laser array 10 of the present invention partially disassembled. That is, the array 10 of the present invention includes a striped mirror 20 shown disassembled from a coupled waveguide structure 15. As will be described more fully below, the array 10 of the present invention provides a plurality of phase locked optical beams.

In the illustrative embodiment of FIG. 1 the coupled waveguide 15 includes a pair of plate electrodes 35 and 36 and a ceramic slab 40. The slab 40 may be fabricated from alumina, beryllia or other suitable ceramic material. A plurality of waveguide channels (cavities) 50, 51, 52, 53, 54, 55, 56 and 57 are formed by first grinding slots into the slab 40 and then sandwiching the slab 40 between the electrodes 35 and 36. The waveguide channels 50, 51, 52, 53, 54, 55, 56 and 57 are separated by a plurality of coupling walls 58. The walls 58 are shortened to allow a plurality of coupling slots 59 to exist between the waveguide channels 50, 51, 52, 53, 54, 55, 56 and 57. An active medium (typically a $CO_2$ based gas mixture) is provided within the cavities. Further, the coupled waveguide 15 and the striped mirror 20 are mounted within a vacuum chamber (not shown).

The striped mirror 20 includes a plurality of substantially reflective sections 60, 62, 64 and 66 and a plurality of partially transmissive sections 61, 63, 65 and 67. The striped mirror 20 is positioned with respect to the coupled waveguide 15 such that the sections 60, 61, 62, 63, 64, 65, 66 and 67 are in optical alignment with the waveguide channels 50, 51, 52, 53, 54, 55, 6 and 57, respectively. The mirror 20 is generally fabricated from a dielectric substrate which is transparent at the wavelength of the optical output beam. The dielectric substrate is typically fabricated from ZnSe for a $CO_2$ gas laser. As is known in the art the surface of the dielectric substrate which faces the waveguide 15 may be coated with layers of uniform dielectric material having varying indices of refraction such that the mirror 20 is of a desired optical transmissivity and reflectivity. The thicknesses of these layers are typically chosen to be a quarter of a wavelength of the output radiation. The substantially reflective sections 60, 62, 64 and 66 are realized by first etching the coated dielectric substrate by conventional means. Next, the sections 60, 62, 64 and 66 are coated with additional layers of an optically reflective substance such as gold. The reflective layers may be deposited on the dielectric substrate by masking processes familiar to those skilled in the art. Given specifications for a desired reflectivity transmissivity characteristic, the mirror 20 may be fabricated by a mirror vendor. Coherent Inc. of Mountain View, California, for example, is one such vendor.

The advantageous operation of the waveguide laser array 10 of the present invention may be appreciated with a review of a conventional coupled waveguide laser array 10', as shown in the top sectional view of FIG. 2a. The array 10' includes a coupled waveguide structure 15', a reflective resonator mirror 21,, and a resonator mirror 20' positioned a slight distance from the waveguide 15'. The array 10' is enclosed within a vacuum chamber (not shown). The mirror 21' is completely reflective while the mirror 20, is uniformly partially reflective and partially transmissive. Again, the degree of reflectivity of the mirror 20' is adjusted by controlling the thickness of a uniform dielectric layer deposited on the surface of the mirror 20' facing the waveguide 15, The coupled waveguide 15' includes a plurality of waveguide channels 50', 51', 52', 53', 54', 55', 56' and 57' and 57' separated by a plurality of coupling walls 58'. The centers of the channels 50', 51', 52', 53', 54', 55', 56' and 57' are separated by a interchannel spacing width 'w'. The distance between the centers of the peripheral channels 50' and 57' is denoted by array width 'W'. Additionally, an active medium (not shown) such as a $CO_2$ based gas mixture is provided within the waveguide 15'.

As is known in the art the active medium may be made to lase at a particular frequency in response to the application of rf energy. Light energy is thereby emitted within the waveguide channels 50', 51', 52', 53', 55', 56' and 57' which oscillates between the mirrors 20' and 21' to form a plurality of confined optical beams. The beams are partially transmitted by the mirror 20'. The array 10 provides four output beams 80' of a first (+) phase and four output beams 82' of a second (−) phase. The illustrative representation of the beams 80' and 82' in FIG. 2a indicates the phase relationship between the beams 80' and 82' and is not intended to suggest horizontal polarization.

The coupling walls 58' allow mutual coupling of light energy between the waveguide channels 50', 51', 52', 53', 54', 55', 56' and 57'. In the embodiment of FIG. 2a this mutual coupling constrains the beams 80' and 82' to be separated in phase by 180 degrees. That is, adjacent beams 80' and 82' are locked 180 degrees out of phase and are therefore in the "−+−+−+−" supermode.

In this mode, the phase locked beams 80' and 82' combine to form a far-field radiation pattern 90' as shown in FIG. 2b. The pattern 90' includes a pair of lobes which form an angle proportional to the quotient of the wavelength (lambda) of the beams 80' and 82' and the interchannel spacing width 'w'. Each of the lobes within the pattern 90' subtends an angle approximately proportional to the quotient of the radiation wavelength and the array width 'W'. As discussed in the Background of the Invention, the pattern 90, formed by the "+−+−+−+−" supermode is undesirable in many instances.

In contrast, the beams 80 provided by the improved coupled waveguide laser array 10 of the present invention combine to form a substantially single lobe radiation pattern 92 shown in FIG. 3b. Again, the angle subtended by the main lobe of the pattern 92 is approximately proportional to the quotient of the radiation wavelength and the array width 'W'. The minor lobes in the pattern 92 arise due to the 2w separation between each of the radiating channels 51, 53, 55 and 57. The pattern 92 is substantially similar to the single lobe radiation pattern generated by coupled laser arrays operating with a uniphase "++++" output.

FIG. 3a shows a top sectional view of the improved coupled waveguide laser array 10 of the present invention. The array 10 includes the coupled waveguide structure 15, a conventional optically reflective mirror 21 and the striped mirror 20. As was mentioned above with respect to the mirror 20' of the conventional coupled waveguide laser array 10', the striped mirror 20 included within the present invention is slightly offset from the waveguide 15. That is, to minimize optical diffraction losses the mirror 20 is positioned as close as is possible to the waveguide 15 without being unacceptably eroded by rf discharge emitted thereby. The coupled waveguide 15 includes the waveguide channels 50, 51, 52, 53, 54, 55, 56 and 57 separated by the coupling walls 58. The striped mirror 20 includes the substantially reflective 10 sections 60, 62, 64 and 66 and the partially transmissive sections 61, 63, 65 and 67. An active medium such as a $CO_2$ based gas mixture is provided in a conventional manner within the waveguide channels 50, 51, 52, 53, 54, 55, 56 and 57.

The operation of the array 10 of the present invention is similar to that of the conventional array 10' with the exception that the mirror 20 is striped to permit light from the waveguide channels 50, 52, 54 and 56 to exit while retaining light oscillating within the waveguide channels 51, 53, 55 and 57. As the waveguide 15 in the illustrative embodiment of FIG. 3a is inclined to phase lock in the ++−+−+−+" supermode, beams oscillating within the waveguide channels 51, 53, 55 and 57 will be of the first phase while beams within the waveguide channels 50, 52, 54 and 56 will be of a second phase. The substantially reflective sections 60, 62, 64 and 66 of the mirror 20 constrain the beams of the second phase generated within the waveguide channels 50, 52, 54 and 56 to remain confined within the coupled waveguide 15. In this manner the four beams 80 of the first phase are transmitted by the partially transmissive sections 61, 63, 65 and 67 of the mirror 20. The beams 80 combine to form the generally desirable far-field radiation pattern 92 shown in FIG. 3b.

It should be clear that the partially transmissive sections 61, 63, 65 and 67 of the mirror 20 not only transmit the beams 80 but also reflect into the waveguide channels 51, 53, 55 and 57 a portion of the optical energy emanating therefrom. The optical transmissivity and reflectivity of the partially transmissive sections 61, 63, 65 and 67 is typically chosen to maximize the intensity of the beams 80. As in conventional waveguide laser arrays, parameters including the degree of optical coupling between, and dimensions of, the waveguide channels 50, 51, 52, 53, 54, 55, 56 and 57 generally influence the choice of reflectivity and transmissivity for the sections 61, 63, 65 and 67 of the mirror 20. Values of transmissivity ranging from 10 to 30% are typically chosen for the sections 61, 63, 65 and 67.

In applications where two sets of symmetrically phase locked beams are desired, a second striped mirror (not shown) may be substituted for the conventional mirror 21 in FIG. 3a. In this manner optical beams are emitted from both ends of the waveguide channels 51, 53, 55, and 57.

While the present invention has been described herein with reference to a particular embodiment, it is understood that the invention is not limited thereto. For example, a plurality of individual mirrors of differing optical transmissivity and reflectivity may be substituted for the mirrors 20 and 21 without departing from the scope of the present invention. Further, with access to the teachings of the present invention it may be obvious to one having ordinary skill in the art to modify coupled waveguide laser arrays (including two dimensional arrays) other than those disclosed herein to provide a set of symmetrically phase locked beams. It is therefore contemplated by the appended claims to cover any and all such modifications.

Accordingly,

What is claimed is:

1. A coupled waveguide gas laser array comprising: first and second electrodes;
first laser means disposed between said first and second electrodes for providing a first cavity along a first longitudinal axis and an output aperture at a first end thereof for providing a first beam in a first direction;
second laser means disposed between said first and second electrodes for providing a second cavity along a second longitudinal axis substantially parallel to said first longitudinal axis, said second means having an output aperture at a first end thereof to provide a second beam in said first direction;
an active medium disposed within said first and second cavities;
means for coupling said first cavity to said second cavity; and
a mirror mounted in a plane transverse to said longitudinal axes having
a first partially transmissive section mounted in optical alignment with said first beam and
a second substantially reflective section mounted in optical alignment with said second beam.

2. The laser array of claim 1 wherein said second section of said mirror is mounted at the output aperture of said second laser means.

3. The laser array of claim 1 wherein said output apertures of said first and second laser means extend through a planar surface of said first and second laser means, said planar surface being transverse to said longitudinal axes.

4. The laser array of claim 3 wherein said mirror is mounted adjacent and parallel to said planar surface of said laser means.

5. The laser array of claim 1 wherein said means for coupling said first cavity to said second cavity includes means for optically coupling said first cavity to said second cavity.

6. The laser array of claim 5 wherein said means for optically coupling includes an optically transparent slot within a wall separating said first and second cavities.

* * * * *